United States Patent
Schürg et al.

(10) Patent No.: US 8,613,479 B2
(45) Date of Patent: Dec. 24, 2013

(54) AIRCRAFT PASSENGER SEAT

(75) Inventors: Hartmut Schürg, Schwäbisch Hall (DE); Oliver Forgatsch, Meersburg (DE); Christian Pilgram, Langenargen (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 1121 days.

(21) Appl. No.: 10/587,218

(22) PCT Filed: Jan. 24, 2005

(86) PCT No.: PCT/EP2005/000638
§ 371 (c)(1),
(2), (4) Date: Jul. 25, 2006

(87) PCT Pub. No.: WO2005/073083
PCT Pub. Date: Aug. 11, 2005

(65) Prior Publication Data
US 2007/0138848 A1    Jun. 21, 2007

(30) Foreign Application Priority Data
Jan. 29, 2004   (DE) .......................... 10 2004 004 339

(51) Int. Cl.
*A47B 39/00*   (2006.01)
(52) U.S. Cl.
USPC .. 297/163; 297/149; 297/188.04; 297/188.07
(58) Field of Classification Search
USPC ................. 297/163, 146, 188.04, 188.07, 14, 297/188.049
See application file for complete search history.

(56) References Cited

U.S. PATENT DOCUMENTS

| | | | | |
|---|---|---|---|---|
| 345,710 | A * | 7/1886 | Mason | 211/31 |
| 2,619,395 | A * | 11/1952 | Kent | 108/38 |
| 3,049,374 | A | 8/1962 | Nance | |
| 3,615,115 | A * | 10/1971 | Buxton | 294/31.2 |
| 3,615,118 | A * | 10/1971 | Buxton | 297/188.07 |
| 4,726,621 | A * | 2/1988 | Muller | 297/146 |
| 4,836,602 | A | 6/1989 | d'Almada Remedios et al. | |
| 5,375,907 | A * | 12/1994 | Rogers et al. | 297/113 |
| 5,507,556 | A | 4/1996 | Dixon | |
| 5,695,240 | A | 12/1997 | Luria | |
| 5,720,515 | A * | 2/1998 | Haffner | 297/188.04 |
| 6,092,705 | A * | 7/2000 | Meritt | 224/275 |
| 6,450,571 | B1 * | 9/2002 | Canni et al. | 297/188.04 |
| 6,494,533 | B1 * | 12/2002 | Bohler | 297/188.05 |
| 6,994,401 | B1 * | 2/2006 | Fischer et al. | 297/452.14 |

FOREIGN PATENT DOCUMENTS

FR    2 577 776    8/1986
WO   WO 02/32268    4/2002

* cited by examiner

Primary Examiner — David Dunn
Assistant Examiner — Erika Garrett
(74) Attorney, Agent, or Firm — Roylance, Abrams, Berdo & Goodman LLP

(57) ABSTRACT

An aircraft passenger seat with seat components, such as a seating piece and a backrest (1) includes a back support structure (11) supporting a backrest cushion (13). On the back face of the support structure a food table may be folded against the same and extended into an in-use position. A pocket-like container (15), for housing useful objects, such as printed products (17) and traveling utensils 15 is arranged on the support structure. The container (15) is formed by a cavity, extending in the support structure (11) of the backrest (1), at least partly between the folded food table (3) and the backrest cushion (13).

33 Claims, 4 Drawing Sheets

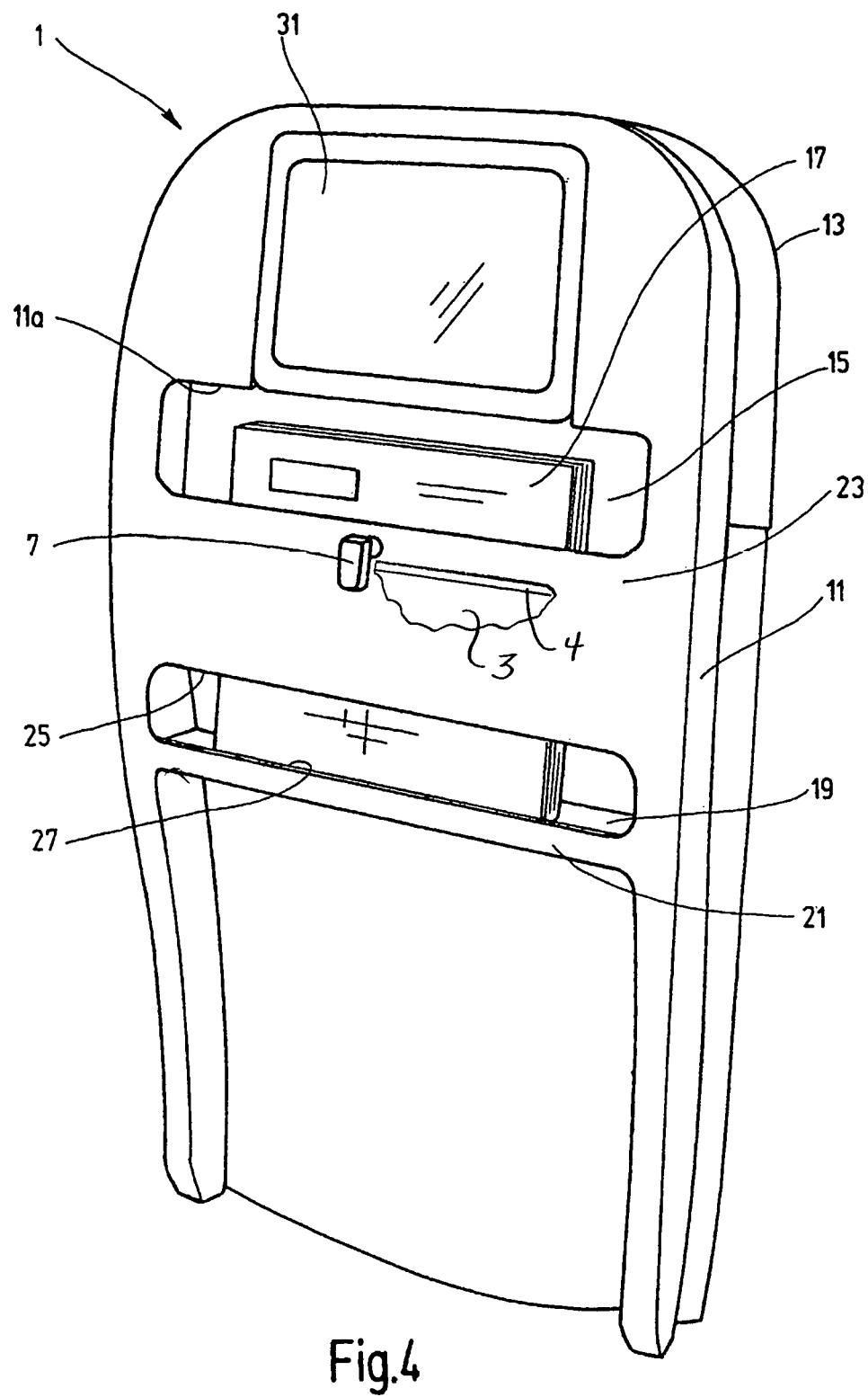

AIRCRAFT PASSENGER SEAT

FIELD OF THE INVENTION

The present invention relates to an aircraft passenger seat with seat components, such as a seat part and a backrest. The backrest has a support structure which bears the backrest cushioning. A tray table can be folded up onto the backrest and folded away into the position of use. A pocket-like receptacle for holding utensils, especially printed materials and travel accessories is also provided on the backrest.

BACKGROUND OF THE INVENTION

Aircraft passenger seats with seat part, backrests, tray tables and receptacles are widely used in conventional passenger aircraft, specifically in airline or charter air transportation. As is recognized, in commercial air transportation for economic reasons a priority objective is to achieve the best possible use of interior cabin space, with as large a number of passenger seats as possible within a given useable space. At the same time, each passenger should have available cabin space sufficient with respect to sitting and/or traveling comfort, as so-called "living space". Known passenger seats do not adequately satisfy the demands to be imposed on adequate "living space" when seating in the cabin space is tight, as is especially the case in air transportation in economy class.

SUMMARY OF THE INVENTION

An object of the present invention is to provide an aircraft passenger seat which, even for tight seating in the cabin interior, makes available comparatively more room to the passenger.

In an aircraft passenger seat, this object is basically achieved according to the present invention in that a receptacle is formed by a cavity extending in the support structure of the backrest at least partially between the folded-up tray table and the backrest cushioning.

In the present invention, a pocket-like receptacle is located in the long unused internal cavity of the support structure of the backrest. In contrast, known aircraft passenger seats have pocket-like receptacles mounted underneath the tray table in the knee area of the passenger next behind. A larger amount of free space is then provided in the knee area. In the known aircraft passenger seats, especially when they are filled with travel literature, conventional safety instructions and other travel accessories, the receptacles cause a major limitation of the free knee and leg space. This limitation is avoided in the present invention.

Advantageously, in the aircraft passenger seat of the present invention, the receptacle is located in the long unused cavity extending from the area of the top edge of the support structure to the structure element of the support structure. The structure element forms the bottom of the receptacle and is located within the surface area of the folded-up tray table.

In this connection, the cavity for forming the main opening of the receptacle in the area bordering the top edge of the support structure can be open toward the rear. The main opening and accordingly the top edge of the support structure can also be offset down in height by an amount so that for this purpose in the support structure additional installation space is formed, for example for holding a display screen or the like.

As the rear wall of the pocket which is exposed when the tray table is folded away, the support structure of the backrest above the structure element which forms the bottom of the receptacle has a plate which passes between the two side edges of the support structure and onto which the tray table can be folded.

This plate can have a latch for fixing the tray table in the folded-up position.

Between the lower edge of the plate forming the rear wall of the receptacle and the structure element forming the bottom of the receptacle, a slot-like bottom-side opening of the receptacle can be formed. This opening easily allows removal of small articles which are stored in the receptacle and easy cleaning of the receptacle.

A small projecting lip on the edge of the structure element can border the bottom-side opening of the receptacle to prevent printed material or smaller travel accessories located in the receptacle from slipping out. The support structure can be additionally reinforced by a transversely extending bar underneath the receptacle.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 4 is a schematically simplified, perspective rear view of an aircraft passenger seat according to a second embodiment of the present invention, with an integrated display screen.

DETAILED DESCRIPTION OF THE INVENTION

Figure 1:
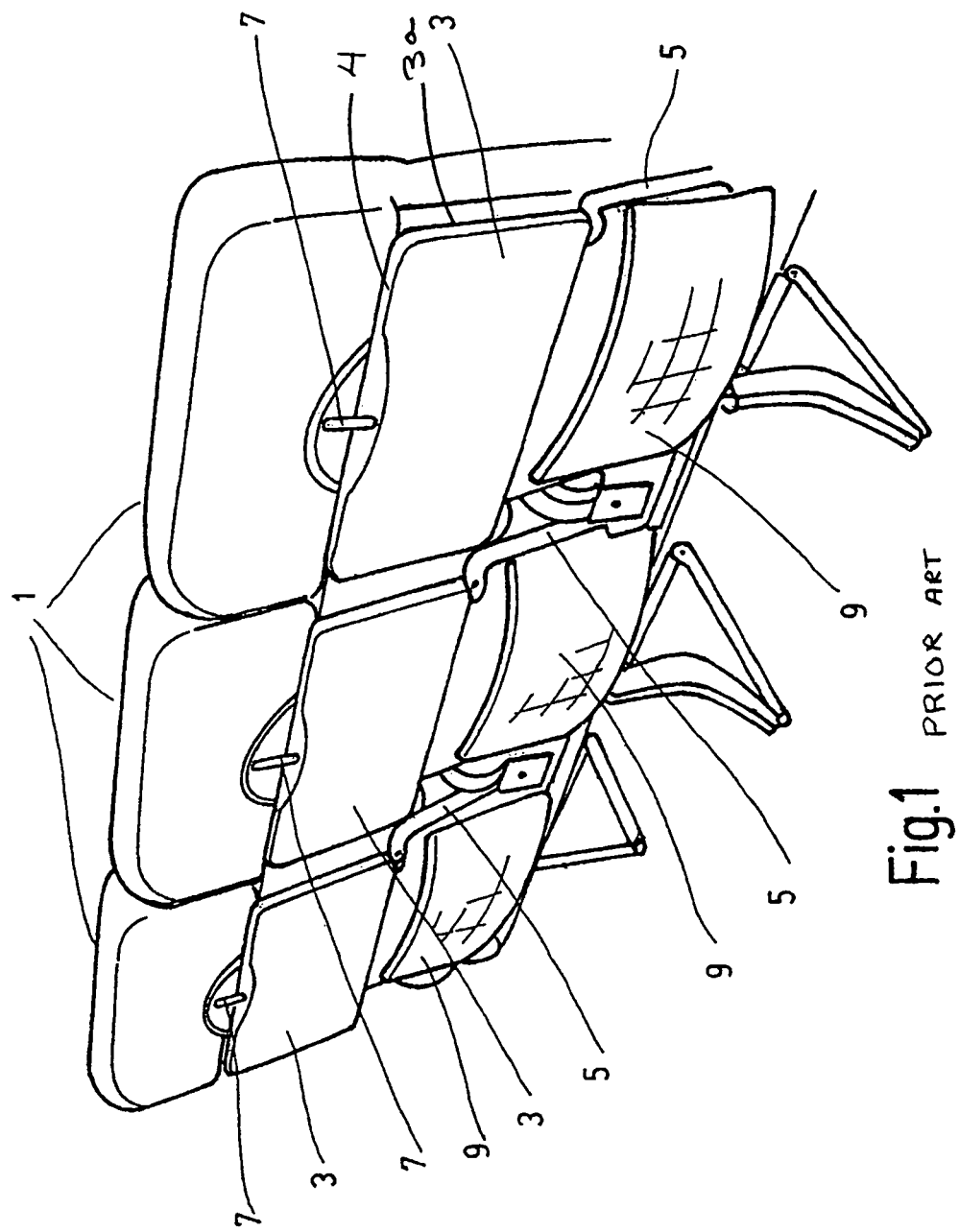
FIG. 1 is a schematically simplified, partially cutaway perspective rear view of a seat row section with three aircraft passenger seats according to the prior art, only the area from their backrests being visible.

FIG. 1 shows a section of a row of seats with three aircraft passenger seats according to the prior art, the area of their backrests being shown. Tray tables 3 are arranged to be able to move in the conventional manner on articulated arms 5, and are shown in FIG. 1 in the non-use position, folded up onto the backrest 1. In this position, the tray tables 3 can be detachably fixed by locking latches 7 configured and made in the conventional manner.

Underneath the tray tables 3 are pocket-like receptacles 9 which, in the known aircraft passenger seats, are made in the form of pockets for printed material as net pockets or pockets with a closed wall. As FIG. 1 shows, these pocket-like receptacles 9, when they are filled with printed material, for example conventional safety instructions for flight operation, with travel accessories, other printed material and the like, bulge to the rear and limit the leg area of the passenger sitting behind, especially in the knee area.

Figure 2:
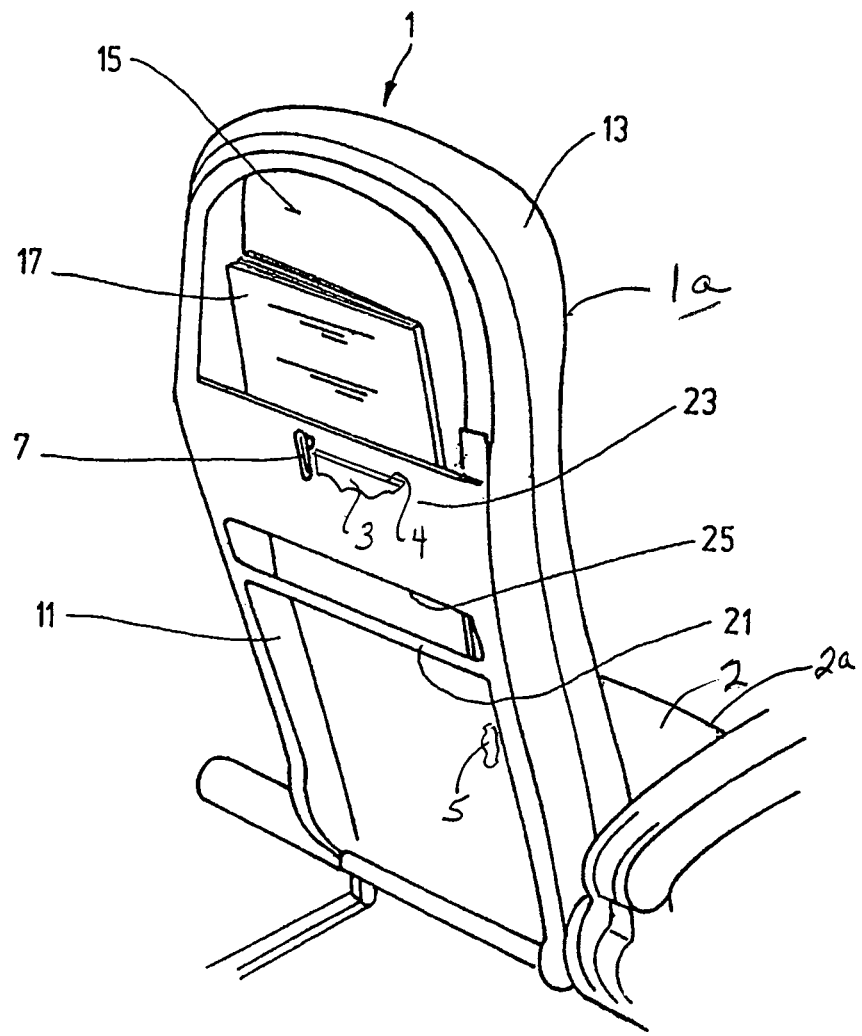
FIG. 2 is a schematically simplified, perspective rear view of only the area of the backrest of an aircraft passenger seat according to a first embodiment of the present invention, with the tray table being omitted.

In FIG. 2, the support structure 11 of a backrest 1, according to one exemplary embodiment of the present invention, bears the backrest cushion 13. FIG. 2 shows the backrest 1 generally from its back. For the sake of clarity, the tray table 3 is omitted, which, when it is folded up onto the back of the support structure 11, can be locked by the swiveling latch 7 in the folded-up position. Latch 7 extends in the conventional manner over the top edge of the folded-up tray table 3.

Figure 3:
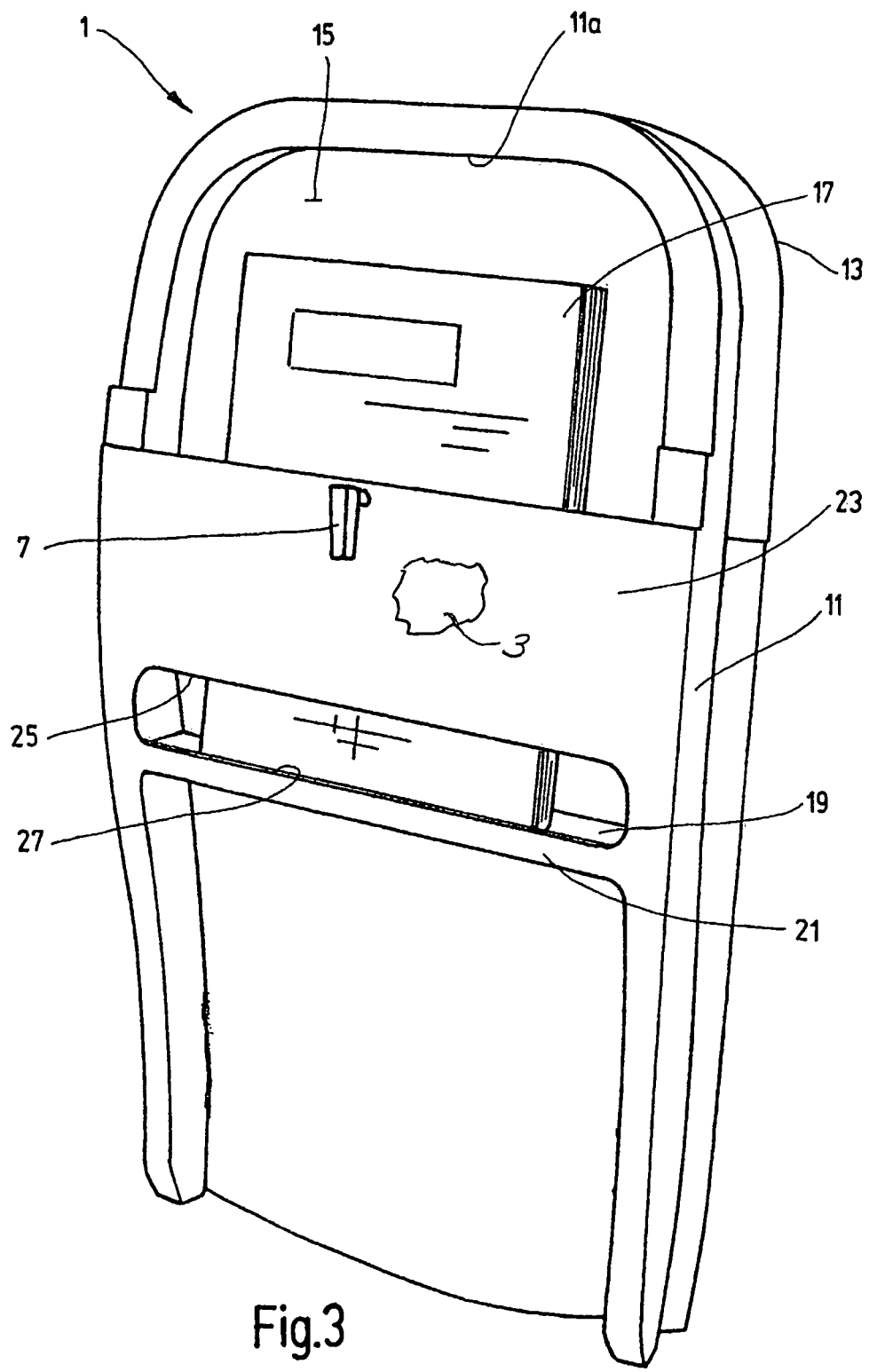
FIG. 3 is a perspective rear view of the backrest only of the embodiment of FIG. 2, enlarged compared to FIG. 2.

FIG. 3 shows more clearly and on a larger scale the details of the support structure 11. In the support structure 11, the inner cavity extends between the front of the support structure 11 bearing on the backrest cushion 13 and its back in the region in which the tray table 3 can be folded onto the support structure 11 and can be fixed by the latch 7. This inner cavity is used as pocket-like receptacle 15 for holding articles, for example printed material 17. The bottom 19 of the receptacle 15 formed by the cavity is formed by a structure element 21 extending transversely from side edge to side edge of the support structure 11. To prevent articles from falling out of the receptacle 15 when the tray table 3 has been folded away, above the structure element 21 a plate 23 forms the rear wall of the receptacle and extends from side edge to side edge of the support structure 11. This plate 23 bears the movable latch 7 for locking the tray table 3 shown in FIG. 1.

Between the structure element 21 forming the bottom 19 of the receptacle and the plate 23 a distance defines a slot-like opening 25. This bottom-side opening 25 of the receptacle 15 formed by the cavity makes it possible for it to be easily cleaned and smaller accessories to be comfortably removed. To prevent printed material 17 or other articles from unintentionally slipping out, on the edge of the structure element 21 bordering the bottom 19 to the outside, a lip 27 projects slightly in the form of ribs.

In the illustrated exemplary embodiments, the receptacle 15 is an integral component of the backrest support structure 11. Accordingly a type of hard box with stiffly made segment parts of the back rest is implemented for the receptacle 15. For this purpose, the backrest structure in spite of the added receptacle is stiffened as before. For example, in case of a crash, the crash forces occurring cannot then lead to the seat collapsing, especially in the area of its backrest. The transversely extending, continuous plate 23 between the two side or structure bars of the U-shaped support structure 11 is especially helpful in this connection.

In a second embodiment shown in FIG. 4, the top edge 11a of the support structure 11 in the direction of the tray table 3, which is not detailed, is shifted down by a height. A display screen 31 can then be integrated into the support structure 11. Thus, on the back of the backrest, a uniform surface is attained which in the case of a crash or an impact can reliably accommodate and distribute the body forces which way be applied to minimize the danger of injury for a rear seat occupant.

By eliminating the pocket located underneath the tray table 3 in the knee area of the aircraft passenger seat located directly behind, the aircraft passenger seat of the present invention makes available an enlarged "living space" for the user of the aircraft passenger seat located directly behind. By using the cavity not otherwise used within the support structure 11 of the backrest 1, remote from seat part 2 from which the backrest extends and remote from backrest supporting face 1a for supporting a user's back as the receptacle or pocket for printed material, without having to tolerate the corresponding disadvantages, it becomes possible to implement tighter seating on the pertinent aircraft, and to exploit the corresponding economic advantage.

As conventionally known and shown in FIG. 1, the top edge 4 of the tray table 3 with a face 3a, when in its stored position, is located adjacent to and under the pivot axis of latch 7. By this positioning, the latch retains the tray table in its stored position when the latch is pivoted to its vertical position and releases the tray table for movement to its use position when latch 7 is in its horizontal position.

The seat includes a seat part 2 with a forward edge 2a (as shown in FIG. 2) and an opposite rear edge. The relative positioning of the latch and tray table shown in FIG. 1 would be necessary apply to the embodiments of the present invention shown in FIGS. 2-4. Since latch 7 is below the main opening of the receptacle, the top edge of the tray table will also necessarily be below the main opening allowing the main opening to be open and exposed when the tray table is in its stored position.

While various embodiments have been chosen to illustrate the invention, it will be understood by those skilled in the art that various changes and modifications can be made therein without departing from the scope of the invention as defined in the appended claims.

What is claimed is:

1. An aircraft passenger seat, comprising:
a seat part;
a backrest extending from said seat part and having a front surface facing said seat part, a support structure and backrest cushioning bearing on said support structure;
a tray table coupled to said support structure and foldable between a stored position on a back of said support structure and a use position away from said back of said support structure; and
a pocket receptacle on said back of said support structure for holding utensils, printed materials and travel accessories, said receptacle being a cavity overlapping at least partially said tray table in the stored position in a direction perpendicular to said front surface of said backrest and having a main opening for introducing objects into said cavity, said main opening being open and exposed when said tray table is in the stored position, said tray table remaining outside said cavity in the stored position.

2. An aircraft passenger seat according to claim 1 wherein
said backrest is extendable in an upright position having a main direction oriented in a vertical direction;
said cavity extends from an area adjacent a top edge of said support structure to a structure element forming a bottom of said receptacle and located within a surface area of said tray table in the stored position; and
said top edge of said support structure and said bottom of said receptacle are defined relative to said vertical direction.

3. An aircraft passenger seat according to claim 2 wherein said main opening is adjacent said top edge of said support structure and opens in a back direction away from said backrest cushioning.

4. An aircraft passenger seat according to claim 2 wherein a plate extends between two side edges of said support structure and in said vertical direction, above said structure element, and forms a rear wall of said receptacle, said plate being distinct from said tray table.

5. An aircraft passenger seat according to claim 4 wherein said plate supports a latch for fixing said tray table in the stored position, said latch being supported on said plate in the stored and use positions of said tray table.

6. An aircraft passenger seat according to claim 4 wherein an elongated bottom opening extends between said structure element and said plate.

7. An aircraft passenger seat according to claim 6 wherein said support element comprises a lip on an edge thereof bordering said bottom opening and projecting into an inside width of said bottom opening.

8. An aircraft passenger seat according to claim 4 wherein said plate is fixedly connected to said support structure.

9. An aircraft passenger seat according to claim 2 wherein said top edge of said support structure receives a display screen integrated therein.

10. An aircraft passenger seat according to claim 1 wherein
said tray table comprises a face facing said cavity in the stored position; and
said main opening allows removal of items stored in said cavity in a direction parallel to said face in the stored position of said tray table.

11. An aircraft passenger seat according to claim 1 wherein
said backrest comprises a backrest supporting face for supporting a user's back;
said backrest has at least an upright position in which said backrest has a main direction oriented in a vertical direction;
a wall piece is spaced in a direction perpendicular to said backrest supporting face from a rear wall of said support structure bearing said backrest cushioning to form a hollow space forming said cavity, said wall piece and said rear wall being distinct from said tray table, said tray table abutting on said wall piece in the stored position; and
said tray table, in the stored position, has relative to the vertical direction a top edge below a top edge of said wall piece.

12. An aircraft passenger seat according to claim 11 wherein
a latch for fixing said tray table in the stored position is mounted on a rear side of said wall piece.

13. An aircraft passenger seat according to claim 12 wherein
said latch extends over said top edge of said tray table in the stored position.

14. An aircraft passenger seat according to claim 11 wherein
said upper edge of said wall piece defines said main opening; and
a latch for fixing said tray table in the stored position is mounted below said upper edge of said wall piece.

15. An aircraft passenger seat according to claim 11 wherein
said main opening of said cavity is formed by said top edge of said wall piece.

16. An aircraft passenger seat according to claim 1 wherein
said backrest has at least an upright position in which said backrest has a main direction oriented in a vertical direction; and
a latch for fixing said tray table in the stored position is, relative to the vertical direction, mounted below said main opening.

17. An aircraft passenger seat according to claim 1 wherein said tray table is distinct from said support structure.

18. An aircraft passenger seat according to claim 1 wherein
said backrest has at least an upright position in which said backrest has a main direction oriented in a vertical direction;
said backrest has an upper half and a lower half relative to the vertical direction; and
said main opening is placed in said upper half.

19. An aircraft passenger seat according to claim 18 wherein
said main opening is placed at a top of the cavity relative to the vertical direction.

20. An aircraft passenger seat according to claim 1 wherein
said backrest has at least an upright position in which said backrest has a main direction oriented in a vertical direction; and
relative to the vertical direction, said main opening is placed above a top edge of said tray table in the stored position.

21. An aircraft passenger seat according to claim 1 wherein the utensils are maintained in the receptacle when said tray table is in the use position.

22. An aircraft passenger seat according to claim 1 wherein
said backrest comprises a backrest supporting face for supporting a user's back; and
said receptacle is, relative to a direction perpendicular to the backrest supporting face, at least partially covered by said tray table in the stored position.

23. An aircraft passenger seat according to claim 1 wherein
said cavity is formed by at least four wall parts that adjoin each other, are distinct from said tray table and face each other by pairs.

24. An aircraft passenger seat according to claim 1 wherein
said cavity extends in said support structure horizontally between said tray table in the stored position and said backrest, and overlaps said tray table in the stored position in vertical extents thereof.

25. An aircraft passenger seat, comprising:
a seat part;
a backrest extending from said seat part and having a front surface facing said seat part and a rear surface remote from and facing oppositely from said front surface;
a support structure on said rear surface defining a cavity on said rear surface and having laterally spaced side portions;
a plate extending between said side portions and spaced from said rear surface defining a receptacle, said plate having a top edge defining a main opening for inserting items into and retrieving items from said receptacle and having a bottom edge spaced from said top edge;
a structure element extending between said side portions spaced from said top edge, adjacent said bottom edge and forming a bottom of said receptacle; and
a tray table mounted on said rear surface for movement between a stored position overlying a rear, outer surface of said plate and a use position spaced from said backrest, said tray table having an upper edge in said stored position located below said top edge of said plate maintaining said main opening unobstructed in the stored position of said tray table, said tray table in the stored position overlapping said receptacle at least partially in a direction perpendicular to said front surface of said backrest.

26. An aircraft passenger seat according to claim 25 wherein
a latch for securing said tray table in the stored position is mounted on said plate between said top edge and said bottom edge.

27. An aircraft passenger seat according to claim 26 wherein
said latch is adjacent said top edge.

28. An aircraft passenger seat according to claim 25 wherein
said tray table is pivotally coupled to said support structure.

29. An aircraft passenger seat according to claim 25 wherein
said plate has a bottom opening adjacent said bottom edge.

30. An aircraft passenger seat according to claim 25 wherein
said receptacle is horizontally between said plate and said rear surface of said backrest, and overlaps said tray table in the stored position in vertical extents thereof.

31. An aircraft passenger seat, comprising:
a seat part;
a backrest extending from said seat part and having a support structure and backrest cushioning bearing on said support structure, said backrest including a backrest supporting face for supporting a user's back and having at least an upright position in which said backrest has a main direction oriented in a vertical direction;
a tray table coupled to said support structure and foldable between a stored position on a back of said support structure and a use position away from said back of said support structure;
a pocket receptacle on said back of said support structure for holding utensils, printed materials and travel accessories, said receptacle being a cavity overlapping at least partially said tray table in the stored position in a direction perpendicular to said backrest supporting face and having a main opening for introducing objects into said cavity, said main opening being open and exposed when said tray table is in the stored position, said tray table remaining outside said cavity in the stored position;
a wall piece spaced in a direction perpendicular to said backrest supporting face from a rear wall of said support structure to form a hollow space forming said cavity, said wall piece and said rear wall being distinct from the tray table, said tray table in the stored position having, relative to the vertical direction, a top edge below a top edge of said wall piece, said tray table in the stored position abutting on said wall piece, said main opening of said cavity being formed by said top edge of said wall piece; and
a latch fixing said tray table in the stored position, and being relative to the vertical direction, mounted below said main opening.

32. An aircraft passenger seat according to claim 31 wherein
said latch extends over said top edge of said tray table in the stored position.

33. An aircraft passenger seat according to claim 31 wherein
said receptacle extends in said support structure horizontally between said tray table in the stored position and said backrest, and overlaps said tray table in the stored position in vertical extents thereof.

* * * * *